Feb. 15, 1927.

F. J. LAHER 1,617,716

AUTOMOBILE BUMPER

Filed March 10, 1926

INVENTOR
Frank J. Laher
BY White Prost
his ATTORNEYS

Patented Feb. 15, 1927.

1,617,716

UNITED STATES PATENT OFFICE.

FRANK J. LAHER, OF OAKLAND, CALIFORNIA.

AUTOMOBILE BUMPER.

Application filed March 10, 1926. Serial No. 93,682.

This invention relates generally to what are commonly known as bumpers and which are employed on automobiles or other vehicles for absorbing impacts.

Automobile bumpers are usually constructed of a plurality of impact rails or bars secured to the frame of an automobile. The bars must be allowed sufficient "give" to absorb impacts and at the same time must be sufficiently strong to withstand severe forces without injury. Unless the impact bars are properly reinforced they must be made excessively heavy, thus increasing the cost of manufacture.

It is an object of this invention to devise an automobile bumper which will withstand severe impacts but which may be cheaply manufactured and will be pleasing in appearance.

It is a further object of this invention to construct a bumper which is fully reinforced against impacts but which may be constructed out of a minimum number of parts.

Further objects of this invention will appear from the following description in which I have set forth the preferred embodiment of my invention.

Referring to the drawings.

Figure 1:
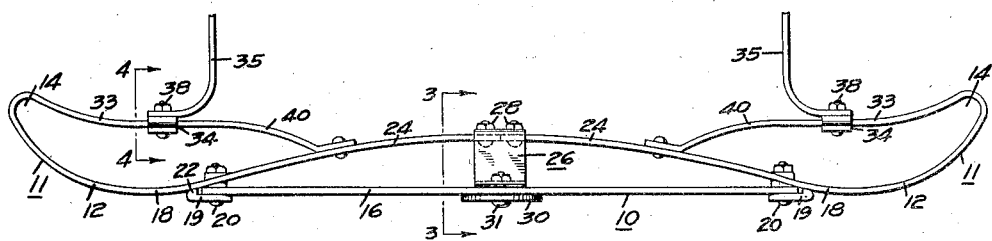
Figure 1 is a plan view of a bumper constructed in accordance with this invention.
Figure 2:
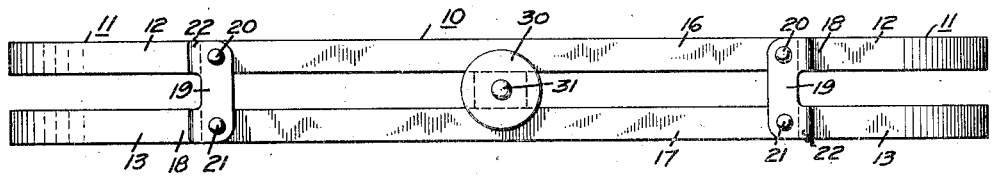
Fig. 2 is a front view of the bumper shown in Fig. 1.

In the construction illustrated the bumper comprises generally a front impact member 10 secured to a pair of side impact members 11. Each of the side impact members 11 is preferably formed of a plurality of vertically spaced bars 12 and 13 which are doubled or bent to form a closed loop portion 14. The front impact member 10 preferably comprises a plurality of vertically spaced bars 16 and 17 which are secured adjacent their ends to the forwardly and inwardly curved front portions 18 of the side bars 12 and 13. Any suitable form of securing means may be employed, the particular one illustrated comprising a spacing plate 19 provided with bolts 20 and 21 which serve to secure together respectively the bars 12 and 16, and the bars 13 and 17. The plate 19 is preferably provided with lugs 22 which serve to cover the ends of the bars 16 and 17.

Figure 3:
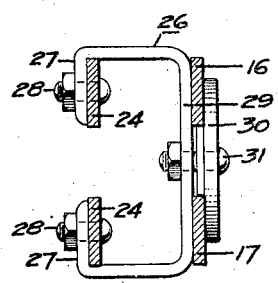
Fig. 3 is a cross sectional view taken along the line 3—3 of Fig. 1.

The front portions 18 are formed with extensions 24 positioned to the rear of the impact member 10 and have their inner ends joined together adjacent the axis of symmetry of the bumper. A suitable means for joining together the inner ends of the extensions 24 is shown in Fig. 3 in which a U-shaped member 26 is provided with inturned projections 27 which are secured to the ends of the upper and lower extensions 24 by means of bolts 28. The front portion 29 of this U-shaped member is suitably secured to the impact bars 16 and 17 as by means of a front clamping plate 30 secured to the portion 29 by means of a bolt 31. Thus the U-shaped member 26 not only serves to join together the adjacent ends of the extensions 24 but also serves as a separator to space this junction point from the central portion of this impact member.

Figure 4:
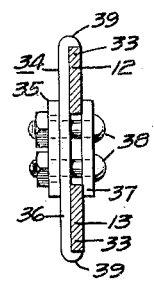
Fig. 4 is a cross sectional view taken along the line 4—4 of Fig. 1.

The rear portions of the bars 12 and 13 are also curved forwardly and inwardly in spaced relation to the front portion 18, to form support portions 33 by means of which the bumper is retained in operative relationship upon the automobile or other vehicle. Thus a suitable clamp 34 is provided for securing the support portions 33 to brackets 35 extending from the frame of an automobile. One form of clamp is shown in Fig. 4 which comprises a pair of clamping plates 36 and 37 engaging opposite sides of the bars 12 and 13 and which are clamped together and secured to the bracket 35 by means of a plurality of bolts 38. To prevent the bars 12 and 13 from spreading, one of the clamping plates 36 may be extended and provided with lugs 39 engaging the outer edges of the bars 12 and 13. To impart more strength to the bumper the support portions 33 are preferably provided with extensions 40 which are curved forwardly and secured at their ends to the extensions 24 at points intermediate the end of the impact member 10 and the center of the bumper. This connection serves to reinforce the bumper so that it is better able to withstand severe impacts.

It will be obvious from the above description that the applicant has provided a bumper of unusual strength and simplicity. As the front impact bars do not extend across the entire width of the bumper they are better able to resist bending and may be readily replaced when injured. Inward bending of the bumper is opposed by tensional stresses in the extensions 24 as these portions serve as trusses for the front impact member. The forming of both the side and front impact members of double vertically spaced bars facilitates securing together the various portions and the use of pin connections is thereby obviated.

I claim:

1. An automobile bumper comprising vertically spaced side bars bent to form looped ends for the bumper, and a separate impact member secured adjacent its ends to the front portions of the loops, said front portions being extended inwardly and joined together centrally of the bumper.

2. An automobile bumper comprising side members bent to form looped ends for the bumper, and an impact member secured adjacent its ends to the front portions of said loops, said front portions being extended inwardly behind said impact member and joined together, the rear portions of the loops forming support means and being extended inwardly and secured at spaced points to the extensions of the front portions, said members being formed of vertically spaced bars.

3. An automobile bumper comprising side bars bent to form looped ends for the bumper, and an impact member secured adjacent its ends to the front portions of said loops, said front portions being extended inwardly behind said impact member and joined together centrally of the bumper, the rear portions of the loops forming support bars and being extended inwardly and secured at spaced points to the extensions of the front portions.

4. An automobile bumper comprising side bars bent to form looped ends for the bumper, an impact bar secured adjacent its ends to the front portions of said loops, said front portions being extended inwardly behind said impact member and joined together centrally of the bumper, the rear portions of the loops forming support bars and being extended inwardly and secured at spaced points to the extensions of the front portions and a separator inserted between the impact bar and the junction between the extensions of said front portions.

5. An automobile bumper comprising a pair of side members each formed of a plurality of vertically spaced bars, said bars being bent to form looped ends for the bumper, an impact member in the form of a plurality of vertically spaced impact bars secured adjacent their ends to the front portions of said loops, said front portions being extended inwardly behind the impact bars and joined together centrally of the bumper, the rear portions of the loops forming support bars and being extended inwardly and secured at spaced points to the extensions of the front portions, and a separator inserted between the impact bar and the junction between the extensions of said front portions.

6. An automobile bumper comprising vertically spaced side bars bent to form looped ends for the bumper, and a separate impact member secured adjacent its ends to the front portions of the loops, the rear portions of the loops being extended inwardly and attached to an intermediate part of the bumper to reinforce the impact bar.

7. An automobile bumper comprising vertically spaced side bars bent to form looped ends for the bumper, an impact member connecting the front portions of said bars, said front portions being extended inwardly and joined together at a point spaced to the rear of said impact member, and a separator inserted between the impact member and said extensions.

In testimony whereof, I have hereunto set my hand.

FRANK J. LAHER.